Feb. 12, 1935. L. A. PARADISE 1,991,226
MOWER
Filed Oct. 25, 1933
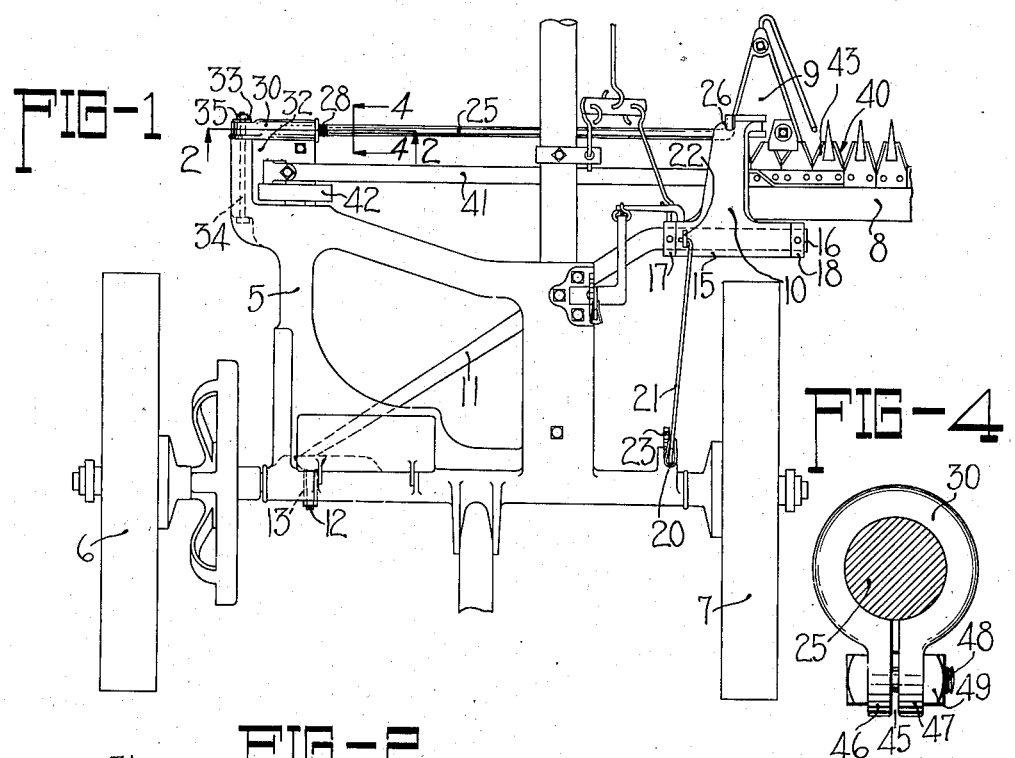
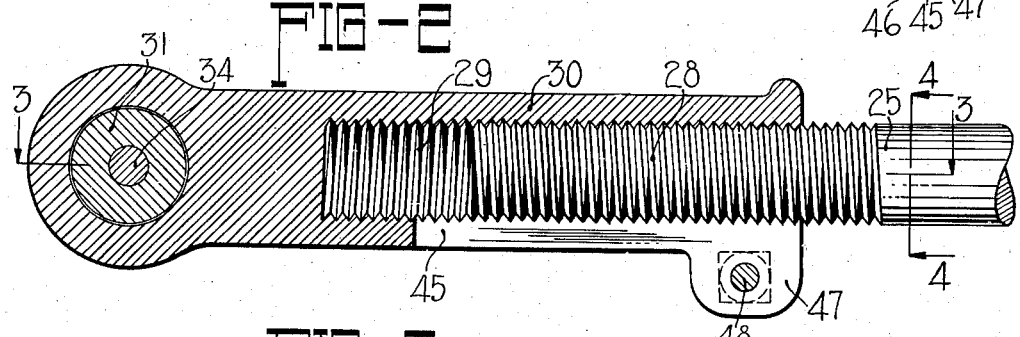
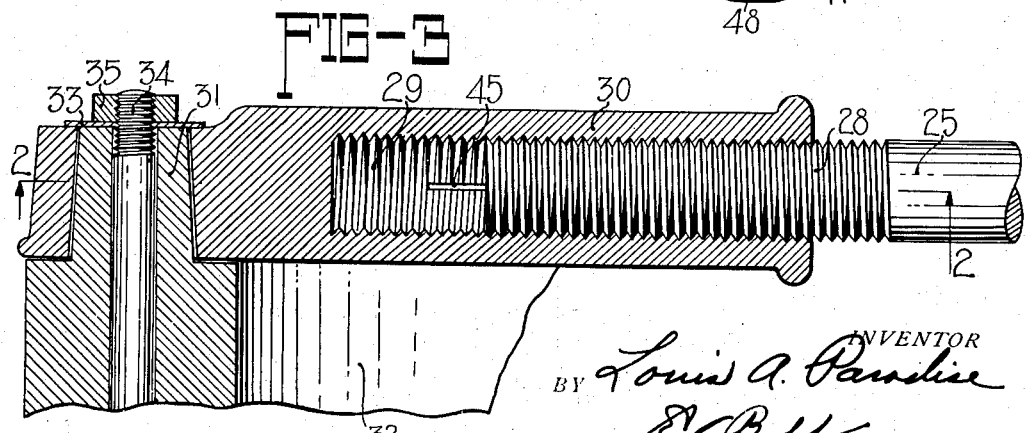
INVENTOR
BY Louis A. Paradise
ATTORNEY Patented Feb. 12, 1935

1,991,226

UNITED STATES PATENT OFFICE 1,991,226

MOWER

Louis A. Paradise, Moline, Ill., assignor to Deere & Company, Moline, Ill., a corporation of Illinois Application October 25, 1933, Serial No. 695,120

1 Claim. (Cl. 56—288)

This invention relates to mowers and more particularly to mowers of the type in which the sickle is supported on a laterally extending cutter bar connected with the frame of the mower by means of a drag bar which is pivotally connected to the frame for vertical swinging movement about a generally longitudinal axis, with the inner end of the cutter bar pivoted to a shoe arch which is journaled on the free end of the drag bar for rocking movement about a transverse axis for the purpose of tilting the cutter bar, and in which the cutter bar is further connected with the mower frame by means of a drag link pivoted at one end to the shoe arch at a point spaced from the point of connection of the shoe arch with the drag bar, the other end of the drag link being threaded into a threaded socket of a connecting member which in turn is pivotally connected to the mower frame for vertical swinging movement about a generally longitudinal axis. In this type of mower, the threaded connection of one end of the drag link with the socket through which it is connected to the mower frame is provided for the purpose of maintaining proper registration between the knife sections of the sickle and the guard fingers of the cutter bar in all tilted positions of the cutter bar. As the cutter bar is tilted, the drag link is rotated a slight amount in the socket and as a result moves inwardly and outwardly a slight amount sufficiently to hold the cutter bar in its proper lateral position. If it were not for this slight longitudinal movement of the drag link incident to its rotation in the socket, the lateral position of the cutter bar would be shifted slightly during tilting of the cutter bar, due to the connection of the drag bar and drag link with the shoe arch at spaced points. Such shifting of the cutter bar would affect proper registration of the knife sections of the sickle with the guard fingers of the cutter bar.

In mowers of this type, due to the relatively rapid reciprocations given to the sickle supported by the cutter bar, the drag link is alternately stressed in tension and compression with the same rapidity. Any looseness of the threaded end of the drag link in the socket permits longitudinal movement of the drag link, setting up a hammer action of the threads of the drag link against the threads of the socket. This results in rapid wear on the threads of the drag link as well as on the threads in the socket. As soon as any appreciable looseness is developed between the drag link and the socket, the drag link no longer functions to hold the cutter bar in its proper lateral position. As a result, proper registration between the knife sections of the sickle and the cutter bar is no longer maintained.

The object of my invention is to provide for a mower of this type, a drag link connecting member in the form of a socket having means whereby the internal boring of the socket may be initially adjusted to exactly the proper size to accommodate the threaded end of the drag link to remove any initial looseness that might be present and also to provide means whereby the internal boring of the socket may be periodically reduced to compensate for the wear of the threaded portions of the drag link and of the socket to maintain a close fit between the drag link and the socket to prevent translatory movement of the drag link relative to the socket yet permit the drag link to rotate relative to the socket when the cutter bar is tilted. I accomplish this object by splitting the socket along one side and by providing means for adjustably drawing the sides of the socket along the split towards each other to reduce the boring of the socket to the amount desired. By the use of my invention registration between the knife sections of the sickle and the guard fingers of the cutter bar can be much more accurately maintained during the life of the mower and the life of the mower itself is greatly prolonged by preventing the occurrence of wear and vibration at a point where vibration ordinarily readily develops.

A preferred embodiment of my invention is described in the following specification in connection with the accompanying drawing wherein:

Figure 1 is a plan view of a mower embodying my invention;

Figure 2 is an enlarged fragmentary cross-sectional view along the line 2—2 of Figures 1 and 3;

Figure 3 is an enlarged fragmentary cross-sectional view along the line 3—3 of Figure 2; and, Figure 4 is a fragmentary cross-sectional view along the line 4—4 of Figures 1 and 2.

The mower shown in Figure 1 comprises a frame 5 supported on a pair of wheels 6 and 7, and a cutter bar 8. Cutter bar 8 is fixed to a shoe 9 which is pivotally connected for vertical movement about a longitudinal axis to a shoe arch 10. Cutter bar 8 is supported from the frame 5 of the mower by means of a drag bar 11. Drag bar 11 is provided with a longitudinally extending journal portion 12 at one end which is loosely journaled in a bearing 13 formed integral with frame 5. Through this connection with frame 5, drag bar 11 has vertical movement with respect to the frame about a generally longitudinal axis. The shoe arch 10 of the cutter bar has a bearing portion 15 by which the shoe arch is journaled upon the transversely disposed end 16 of the drag bar 11. Shoe arch 10 is held in position by means of collars 17 and 18 pinned to the transverse portion 16 of drag bar 11 opposite the two ends of bearing portion 15. Through this connection of shoe arch 10 with the free end of drag bar 11, the cutter bar 8 can be rocked about a transverse axis for tilting purposes. To so rock the cutter bar, a tilting lever 20 is mounted on the frame 5 of the mower which is connected by means of a link 21 to an upstanding lug 22 formed integral with bearing portion 15 of shoe arch 10. Lever 20 is provided with the usual latch mechanism which cooperates with a sector 23 fixed to the frame 5 of the mower to lock the lever in any adjusted position.

The cutter bar 8 is held in proper lateral position by means of a drag link 25 which is pivotally connected at one end to the shoe arch 10 at 26, this point on the shoe arch being spaced forwardly of the bearing portion 15. The opposite end of drag link 25 has a threaded portion 28 which is threaded into a correspondingly threaded portion 29 in a socket 30. Socket 30 is pivotally mounted on a lug 31 formed integral with and projecting forwardly of the bowl portion 32 of frame 5 of the mower. Socket 30 is held in position on lug 31 by means of a washer 33 and bolt 34 supported in a longitudinal boring in bowl portion 32. Bolt 34 is held in place by means of a nut 35.

Upon cutter bar 8 a sickle 40 is slidingly disposed for reciprocatory movement with respect to the cutter bar. Such reciprocatory movement of the sickle is produced by means of a pitman 41 connected to the inner end of the sickle 40 through the usual ball and socket connection. The opposite end of the pitman 41 is journaled upon a crank pin fixed to the flywheel 42 which is rotated through suitable power connections with the supporting wheel 6.

In the manufacture of the mower, the parts are so proportioned, that in the reciprocation of the sickle 40, each knife section 43 thereof is moved from the position directly over one guard finger to a corresponding position over the adjacent guard finger, and it is important that this relationship be maintained at all times and in all tilted positions of the cutter bar to obtain the best operation of the mower. Obviously, any looseness between the threads of the threaded portion 28 of the drag link and the internal threads 29 in the socket will destroy this proper registration of the knife sections with respect to the guard fingers and the cutter bar. To prevent any initial looseness between the threaded portion 28 and the internal threads 29 of socket 30, and also to provide means for compensating for such wear as does occur due to the rotation of drag link 25 in socket 30 when the cutter bar is tilted, I have provided means for periodically reducing the internal boring of the socket. The under side of the socket is split as shown at 45 for substantially the full length of the threads 29. Lugs 46 and 47 are formed integral with the sides of the socket adjacent the split near the open end of the socket. Lugs 46 and 47 are perforated to receive a bolt 48 upon the threaded end of which an adjusting nut 49 is provided.

By turning up nut 49, the sides of the socket along the split will be drawn toward each other, thereby reducing the internal boring of the socket. By this means then, the diameter of the internal boring of the socket 30 may be adjusted to exactly the proper size to receive the threaded portion 28 and may be adjusted to prevent all longitudinal movement of the drag link 25 relative to socket 30, except such as is incident to the rotation thereof, yet of such size as to permit the drag link to be rotated relative to the socket. Furthermore, as the threads of threaded portion 28 and the internal threads 29 of the socket wear due to the rotation of drag link 25 in the socket, the boring 29 of socket 30 may be further reduced periodically to compensate for such wear.

The above arrangement results in a mower wherein proper registration between the knife sections of the sickle and the guard fingers of the cutter bar may be readily maintained during the life of the mower, and wherein the life of the mower itself is greatly prolonged by preventing the development of any destructive hammering action of the threads of the drag link on the threads in the socket connecting the drag link to the mower frame.

What I claim is:—

In a mower having a frame and a cutter bar connected to the frame by a drag bar pivotally connected to the frame for vertical swinging movement about a generally longitudinal axis, upon the free end of which the cutter bar is journaled for rocking movement about a transverse axis and by a drag link pivoted at one end to the cutter bar at a point spaced from said transverse axis, a drag link connecting member for connecting the other end of the drag link to the mower frame comprising an internally threaded socket into which said other end of the drag link is threaded and having means for pivotally connecting it to the mower frame for vertical swinging movement about a generally longitudinal axis, said socket being split along one side, and means for adjustably drawing the sides of said socket along the split towards each other whereby the internal boring of the socket may be periodically reduced to compensate for the wear of the threaded portions of said drag link and said socket to maintain a close fit between said drag link and said socket to prevent translatory movement of said drag link relative to said socket yet permit said drag link to rotate relative to said socket when the cutter bar is rocked about the drag bar.

LOUIS A. PARADISE.